(12) United States Patent  (10) Patent No.: US 8,290,839 B1
Houk et al.  (45) Date of Patent: Oct. 16, 2012

(54) COMPUTER DRIVEN SIMULATOR AND OPTIMIZER FOR DISTRIBUTED CAPTURE IMPLEMENTATION

(75) Inventors: Jon Houk, Lake Elmo, MN (US); Derek Hayes, Medina, MN (US); Doug Balli, Emigration Canyon, UT (US); Kausik Rajgopal, San Francisco, CA (US); John McLeod Stephenson, New York, NY (US); Stephen Kent Ledford, Winterville, GA (US); Christopher Gill, Atlanta, GA (US); Choedpong Khannabha, Norcross, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1295 days.

(21) Appl. No.: 12/023,958

(22) Filed: Jan. 31, 2008

Related U.S. Application Data

(60) Provisional application No. 60/974,647, filed on Sep. 24, 2007.

(51) Int. Cl.
*G06Q 40/00* (2006.01)
(52) U.S. Cl. ................................. 705/35; 705/42; 705/43
(58) Field of Classification Search ...................... 405/39, 405/42, 43, 45, 35
See application file for complete search history.

(56) References Cited

U.S. PATENT DOCUMENTS

| | | | |
|---|---|---|---|
| 4,882,675 A | 11/1989 | Nichtberger | |
| RE34,915 E | 4/1995 | Nichtberger et al. | |
| 2001/0010025 A1 | 7/2001 | Kaust et al. | |
| 2005/0071283 A1 | 3/2005 | Randle et al. | |
| 2005/0097046 A1 | 5/2005 | Singfield | |
| 2005/0243379 A1 | 11/2005 | Klein et al. | |
| 2005/0244035 A1 | 11/2005 | Klein et al. | |
| 2005/0288986 A1 * | 12/2005 | Barts et al. | 705/9 |
| 2006/0026118 A1 | 2/2006 | Jung et al. | |
| 2006/0106717 A1 * | 5/2006 | Randle et al. | 705/45 |
| 2006/0112013 A1 | 5/2006 | Maloney | |
| 2006/0182331 A1 | 8/2006 | Gilson et al. | |
| 2006/0182332 A1 | 8/2006 | Weber | |
| 2006/0186194 A1 | 8/2006 | Richardson et al. | |
| 2006/0249567 A1 * | 11/2006 | Byrne et al. | 235/379 |
| 2007/0014539 A1 | 1/2007 | Kohno | |
| 2007/0031022 A1 | 2/2007 | Frew et al. | |
| 2007/0086642 A1 | 4/2007 | Foth et al. | |

FOREIGN PATENT DOCUMENTS

| | | |
|---|---|---|
| EP | 1195731 | 4/2002 |
| WO | WO8603310 | 6/1986 |
| WO | WO2004079659 | 9/2004 |
| WO | WO2005099036 | 10/2005 |
| WO | WO2006055364 | 5/2006 |
| WO | WO2006086768 | 8/2006 |
| WO | WO2006088756 | 8/2006 |

(Continued)

OTHER PUBLICATIONS

Yolanda Carson and Anu Maria, Simulation Optimization: Methods and Applications, Binghamton, NY, 1997.*

(Continued)

*Primary Examiner* — Lindsay M Maguire
*Assistant Examiner* — Hao Fu
(74) *Attorney, Agent, or Firm* — Merchant & Gould P.C.

(57) ABSTRACT

A computer-implemented system to simulate, analyze, and optimize the financial aspects of a banking institution's plan to convert existing depository locations to distributed capture technology.

10 Claims, 8 Drawing Sheets

FOREIGN PATENT DOCUMENTS

WO WO2007019300 2/2007

OTHER PUBLICATIONS

*FiSite Research—Metavante Introduces Image Capture Service for All Points of Presentment*; http://fisiteresearch.com/fisite/content/view/786/2/; Jul. 20, 2007.

*Image Capture Solutions Home*; http://www.carreker.com/main/solutions/payments/PIM/appl_lib_serv.htm; Jul. 20, 2007.

*Optical Character Recognition for Self-Service Banking*; AT&T Technical Journal; Jul./Aug. 1995.

*Today: Distributed image capture*; http://findarticles.com/p/articles/mi_ga3947/is_200308/ai_n9300892/print; Jul. 20, 2007.

* cited by examiner

[ HIDE ALL SHEETS ] [ SHOW ALL SHEETS ]

REVIEW DASHBOARD RESULTS WITH THE VIEWING OPTIONS BELOW

To filter model results, click the first button to open up the filter menu in MS Access.
The second button displays instructions on how to use the filter:

To view a summary of the model's filtered economic results, click the button: (please note, untill you fill out the filter menu in Access, the filtered results may be from a previous model run)

To view a list of AUs from the filtered results, click the button:

To review volume and FTE results for the model run and for filtered results, click here:

To view EAPD closure dates and rankings by highest average ATM savings, click the button:

To view lost store savings opportunity from ATM conversion hinderance, click the button:

To view a list of "unfiltered" conversion totals by hub, click the button:

To view ground routes and air routes closure status and savings, click the button:

To review hub by hub net savings results, click the button:

To review state by state net savings results, click the button:

To view hub economics and hubs potentially flagged for closure, click the button:

To review sub-hub economics, click the button:

To view a list of AUs on Ground Routes, click the button:

To view a list of AUs on Air Routes, click the button:

*FIG. 6*

Open Access Database to Filter Results

View Instructions For Filtering Menu

View Filtered Cost and Benefit Results

View A List of AUs From The Filtered Results

View Volume & FIE Outputs

View EAPD Rankings

View Lost Savings From ATM Hinderance

View Hub Conversion Totals

View Route Savings and Status

View Hub Yearly Savings

View State Yearly Savings

View Hub Unit Cost Results

View Sub-Hub Calculations

View Ground Route AUs

View Air Route AUs

*FIG. 6 (Cnt'd)*

FIG. 7

| | FILTER | | | | | |
|---|---|---|---|---|---|---|
| Report: | Region | Hub | State | SubRegion | EAPD | EAPD State |
| Enterprise View | | | | | | |

View Filtered Summary By

View Filtered Summary Charts

View Filtered Costs By Channel

View Filtered Benefits By Channel

View The Number of Filtered Conversions

View A List of AUs From Filtered

Go Back To The Output Dashboard

In 000s

| | | Period | | | | | |
|---|---|---|---|---|---|---|---|
| | Total | 2006 | 2007 | 2008 | 2009 | 2010 | 2011 |
| COSTS | | | | | | | |
| 1-Time Cash Outflows | | | | | | | |
| Store - Front Counter | -$2,453 | -$455 | -$1,998 | $0 | $0 | $0 | $0 |
| IDC | -$10,862 | $0 | -$4,042 | -$4,903 | -$1,320 | -$527 | -$70 |
| Envelope Free ATM | -$5,030 | -$672 | -$1,005 | -$884 | -$1,220 | -$1,011 | -$139 |
| Total 1-Time Cash Outflows | -$18,345 | -$1,127 | -$7,045 | -$5,886 | -$2,540 | -$1,537 | -$209 |
| On-going Cash Outflows | | | | | | | |
| Store - Front Counter | -$19,551 | -$245 | -$4,607 | -$5,796 | -$4,452 | -$3,643 | -$808 |
| IDC | -$22,259 | $0 | -$2,345 | -$4,130 | -$7,532 | -$6,692 | -$1,560 |
| Envelope Free ATM | -$9,078 | -$588 | -$1,684 | -$2,104 | -$2,097 | -$2,096 | -$509 |
| Total Ongoing Cash Outflows | -$50,887 | -$832 | -$8,636 | -$12,030 | -$14,081 | -$12,431 | -$2,877 |
| TOTAL COSTS | -$69,232 | -$1,960 | -$15,681 | -$17,916 | -$16,621 | -$13,968 | -$3,086 |
| Cumulative FTE Impact* | | | | | | | |
| IP Saves | | 3 | 109 | 171 | 261 | 242 | 230 |
| EAPD Saves | | 19 | 79 | 131 | 154 | 168 | 171 |
| IP Adds | | 5 | 60 | 89 | 96 | 86 | 79 |
| Store Adds | | 0 | 34 | 62 | 112 | 101 | 94 |
| BENEFITS | | | | | | | |
| On-going Savings | | | | | | | |
| Store - Front Counter | $42,239 | $872 | $10,050 | $11,351 | $9,780 | $8,346 | $1,841 |
| IDC | $77,130 | $0 | $6,164 | $12,332 | $26,642 | $25,663 | $6,330 |
| Envelope Free ATM | $65,378 | $2,088 | $8,300 | $13,566 | $16,996 | $19,329 | $5,098 |
| TOTAL BENEFITS | $184,747 | $2,960 | $24,514 | $37,248 | $53,418 | $53,338 | $13,269 |
| Net Cash Flow (NCF) | $115,515 | $1,000 | $8,833 | $19,332 | $36,797 | $39,370 | $10,183 |
| Cumulative NCF | | $1,000 | $9,833 | $29,165 | $65,962 | $105,332 | $115,515 |
| Discounted Cash Flows (DCF) | | $1,000 | $7,957 | $15,690 | $26,905 | $25,934 | $6,043 |
| Cumulative DCF | | $1,000 | $8,957 | $24,648 | $51,553 | $77,488 | $83,531 |
| 5-yr NPV @ 11% | $83,531 | | | | | | |
| IRR On Cumulative DCF | #NUM! | | | | | | |
| % of Enterprise 5-yr NPV @ 11% | 100% | | | | | | |

* 2011 only shows 1 quarter of data

FILTER

| Report | Region | Hub | State | SubRegion | EAPD | EAPD State |
|---|---|---|---|---|---|---|
| Enterprise View | | | | | | |

Buttons:
- View Filtered Summary By Channel
- View Filtered Summary Charts
- View Filtered Costs By Channel
- View Filtered Benefits By Channel
- View The Number of Filtered Conversions
- View A List of AUs From Filtered
- Go Back To The Output Dashboard Front Page

Period

| | Total | 2006 | 2007 | 2008 | 2009 | 2010 | 2011 |
|---|---|---|---|---|---|---|---|
| COSTS | | | | | | | |
| 1-Time Cash Outflows | | | | | | | |
| IP Severance | -$10,050 | -$504 | -$4,692 | -$2,909 | -$1,233 | -$614 | -$97 |
| EAPD Severance | -$2,690 | -$535 | -$821 | -$615 | -$384 | -$292 | -$41 |
| Hardware/Software/Installation | -$5,605 | -$87 | -$1,531 | -$2,362 | -$923 | -$631 | -$71 |
| Total 1-Time Cash Outflows | -$18,345 | -$1,127 | -$7,045 | -$5,886 | -$2,540 | -$1,537 | -$209 |
| On-going Cash Outflows | | | | | | | |
| Network Upgrade | -$2,169 | $0 | -$176 | -$353 | -$724 | -$732 | -$185 |
| Maintenance | -$5,781 | -$26 | -$1021 | -$1,667 | -$1,606 | -$1,808 | -$453 |
| Item Destruction | -$2,386 | $0 | -$190 | -$374 | -$808 | -$811 | -$204 |
| Additional Store Labor | -$11,809 | $0 | -$1,161 | -$2,145 | -$3,994 | -$3,648 | -$861 |
| CSSO - PMC Labor | -$6,796 | -$74 | -$1,190 | -$1,719 | -$1,828 | -$1,614 | -$370 |
| CSSO - CIP Labor | -$2,945 | -$54 | -$550 | -$794 | -$750 | -$650 | -$148 |
| CSSO - Adjustments Labor | -$817 | -$19 | -$115 | -$182 | -$216 | -$227 | -$57 |
| CSSO - ATM Risk Review | -$2,357 | -$152 | -$400 | -$471 | -$547 | -$625 | -$162 |
| Cleaning (IHD) | -$14,828 | -$507 | -$3,634 | -$4,326 | -$3,408 | -$2,316 | -$437 |
| Total Ongoing Cash Outflows | -$50,887 | -$832 | -$8,636 | -$12,030 | -$14,081 | -$12,431 | -$2,877 |
| TOTAL COSTS | -$69,232 | -$1,960 | -$15,681 | -$17,916 | -$16,621 | -$13,968 | -$3,086 |
| BENEFITS | | | | | | | |
| On-going Savings | | | | | | | |
| Net Transportation - A&G route reduction | $40,510 | $0 | $901 | $4,256 | $15,243 | $15,942 | $4,168 |
| Transportation - ATM route reduction | $17,526 | $441 | $1,720 | $2,924 | $4,724 | $6,002 | $1,714 |
| CSSO Labor & All Other Ops - Item Processing (Store) | $29,375 | $124 | $4,529 | $6,771 | $8,895 | $7,412 | $1,645 |
| CSSO Labor & All Other Ops - Item Processing (EF) | $2,561 | $62 | $231 | $390 | $683 | $936 | $258 |
| CSSO Labor & All Other Ops - EAPD | $30,999 | $1,138 | $4,499 | $7,162 | $7,928 | $8,221 | $2,051 |
| Float (Interest On Collected Store Items) | $49,484 | $747 | $10,784 | $12,655 | $12,285 | $10,655 | $2,358 |
| Float (Interest on Collected EF Items) | 14,292 | $445 | $1,849 | $3,090 | $3,661 | $4,170 | $1,075 |
| TOTAL BENEFITS | $184,747 | $2,960 | $24,514 | $37,248 | $53,418 | $53,339 | $13,269 |
| Net Cash Flow (NCF) | $115,515 | $1,000 | $8,833 | $19,332 | $36,797 | $39,370 | $10,183 |
| Cumulative NCF | | $1,000 | $9,833 | $29,165 | $65,962 | $105,332 | $115,515 |
| Discounted Cash Flows (DCF) | | $1,000 | $7,957 | $15,680 | $26,905 | $25,934 | $6,043 |
| Cumulative DCF | | $1,000 | $8,957 | $24,648 | $51,553 | $77,488 | $83,531 |

| 5-yr NPV @ 11% | $83,531 |
| IRR On Cumulative DCF | #NUM! |
| % of Enterprise 5-yr NPV @ 11% | 100% |

\* 2011 only shows 1 quarter of data

COMPUTER DRIVEN SIMULATOR AND OPTIMIZER FOR DISTRIBUTED CAPTURE IMPLEMENTATION

CROSS-REFERENCE TO RELATED APPLICATIONS

This application claims the benefit of the following earlier-filed U.S. Provisional Application in accordance 35 USC 119: Application No. 60/974,647, entitled CAPTURE CONFIGURATION MODEL, filed on Sep. 24, 2007 in the names of Houk, Hayes, and Balli. The entirety of the foregoing application is incorporated herein by reference.

BACKGROUND OF THE INVENTION

1. Field of the Invention

The present invention relates to computer-based analysis and simulation. More particularly, the invention concerns a computer-driven system for simulating and optimizing the financial aspects of a plan to implement distributed capture technology.

2. Description of the Related Art

In 2004, Congress enacted a law called the "Check Clearing for the Twenty-First Century Act." People call it "Check21," for short. With the goal of reducing waste and delay in check processing, Check21 enabled banks to handle checks electronically. Instead of transporting paper checks from one institution to another, Check21 allows banks to process checks electronically. Banks capture an image of the front and back of the check along with the associated payment information and transmit this electronically. The use of images, instead of paper checks, is referred to as "image exchange." If someone along the line requires a paper check, the bank can use the electronic image to create a paper proxy called an image replacement document (IRD).

After Check21 came into effect, the first banks to implement image exchange did so by adopting a centralized processing model. With centralized processing, a bank routes paper checks from the bank's various branches or other deposit accepting locations (cash vaults, lockbox operations, etc.) to a central facility, and captures/scans them there. This minimizes the overhead required to start using image exchange, since it processes the checks using a central staff and central computer hardware. Of course, various computers outside this central facility must still be reprogrammed to communicate according to the new requirements of image exchange. For instance, computers must be programmed to retrieve images of checks to satisfy customer inquiries, prepare statements, conduct research, and the like. Further, central computers of the bank must be programmed to electronically transmit the check images to other banks, which is really the main idea in performing image exchange in the first place.

Outside the realm of Check21, it has been a logical extension for banks to scan and digitally process documents beyond checks, such as deposit slips, withdrawal slips, and other such documents. The next extension of image exchange, for some banks, is referred to as "distributed capture." With distributed capture, these same documents are digitized earlier relative to the point of presentment. For instance, local bank branches may perform on-site digitization, instead of forwarding the paper checks to a central processing facility.

A number of software products are aimed at the task of implementing direct capture at banking branches and automated teller machines (ATMs). The present inventors have recognized, however, that implementing direct capture is not as simple and seamless as merely purchasing hardware and software. Indeed, the inventors have recognized that distributed capture technology incurs various costs, and has a complicated relationship with other existing costs. In some circumstances, implementing distributed capture could even be more costly than the status quo. Although on the surface it appears to be simple, there are thousands of variables and considerations, making for tremendous complexity in planning a schedule for implementing distributed capture across a financial network with many deposit accepting locations.

One novel approach to the problem, taken by the present inventors, was to utilize a simulator to help determine prioritization for implementing distributed capture. Indeed, there are many different types of known simulators, such as flight, military, biological, city, weather, medicine, and robotics simulators, to name a few. However, there is no computer model to simulate the financial consequences, over time, of implementing distributed capture technology in a banking institution. Moreover, there is no tool for analyzing or optimizing this plan. Consequently, the state of the art is inadequate for banking institutions facing the daunting process of evaluating and/or prioritizing the implementation of distribute capture technology.

SUMMARY OF THE INVENTION

Broadly, the present disclosure concerns a computer-implemented system to simulate, analyze, and optimize the financial aspects of a banking institution's plan to convert existing depository locations to distributed capture technology.

BRIEF DESCRIPTION OF THE DRAWINGS

FIGS. 6-9 show screen shots of an exemplary output dashboard.

DETAILED DESCRIPTION

Figure 1:
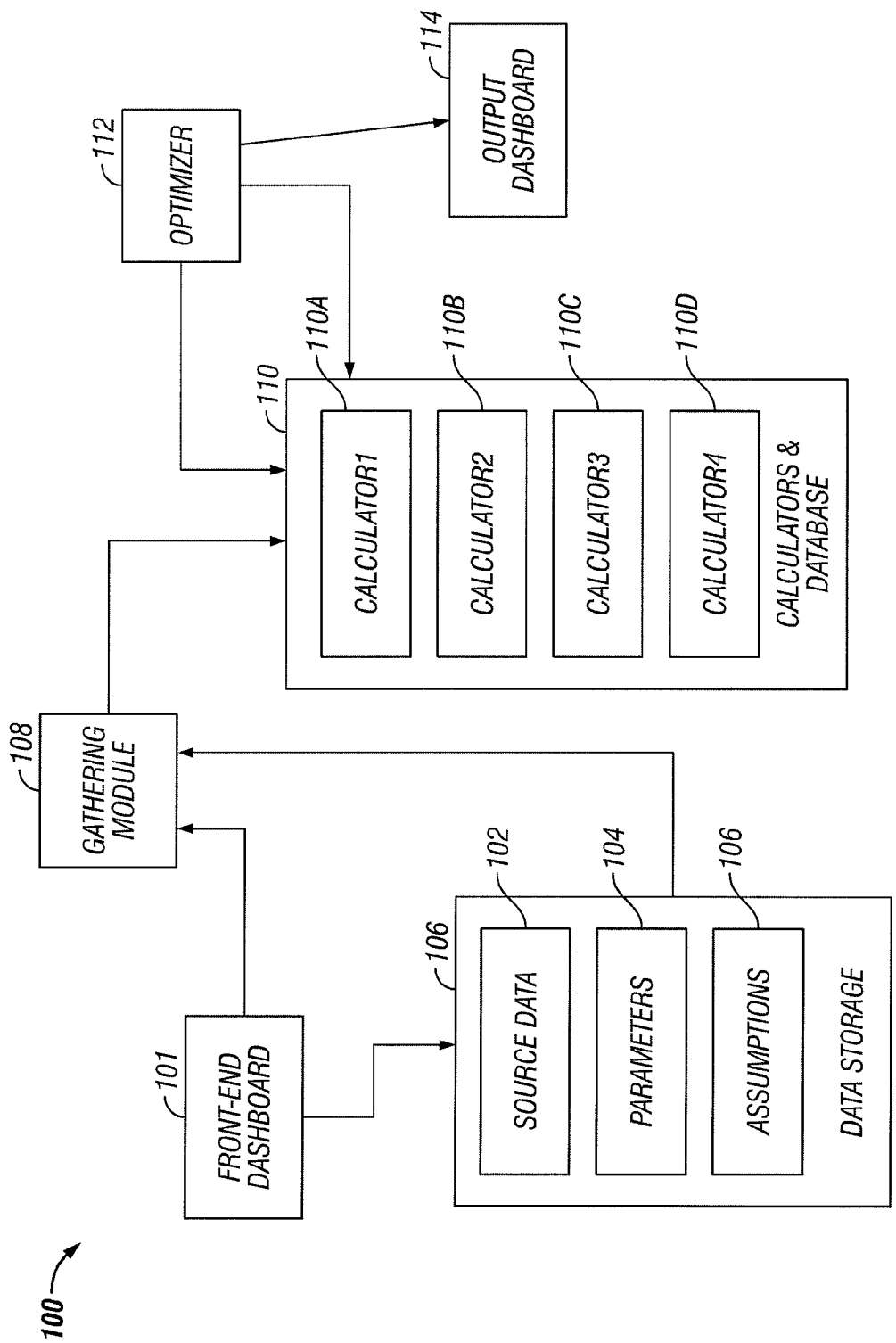
FIG. 1 is a block diagram of the components and interconnections of a computer driven system for simulating, optimizing, and analyzing the financial consequences of a plan to implement distributed capture at a banking institution.

The nature, objectives, and advantages of the invention will become more apparent to those skilled in the art after considering the following description in connection with the drawings.

Hardware Components & Interconnections

Overall Structure

One aspect of the present disclosure concerns a computer-implemented system 100 to simulate, analyze, and optimize the financial aspects of a banking institution's plan to convert existing depository locations to distributed capture technology. Distributed capture technology, in the illustrated example, primarily includes the capture of checks. However, this disclosure contemplates the capture of other document types such as GL tickets, deposit slips, withdrawal slips, savings bonds, treasury tax and loan coupons, and other documents related to financial transactions.

Broadly, the system 100 includes calculators 110 that operate on information from data storage 106 and a front-end dashboard 101. A gathering module 108 manages data transfer from the modules 101/106 to the calculators 110. An optimizer 112 chooses and formats data for reloading the calculators 110, in order to provide for simulation over an extended period of time. The optimizer 112 also analyzes data output by the calculators 110. An output dashboard 114 provides human-readable output of results from the calculators 110 and optimizer 112.

In the system 100, there are various data processing components, such as the front-end dashboard 101, gathering module 108, calculators 110, optimizer 112, output dashboard 114, etc. Each of these may be implemented by one or more devices of hardware, firmware, software; a portion of one or more hardware or software devices; or a combination of these. The makeup of these subcomponents is described in greater detail below, with reference to FIGS. 2-4.

The system, as currently described, pertains to a single banking institution such as a bank, credit union, building society, stock brokerage, asset management firm, etc. For ease of reference, the discussion is simplified by using "bank" to refer to an entity (such as a bank) for whose benefit the system 100 operates.

In one example, the system 100 may be implemented by a computer such as a notebook or desktop computer, computer workstation, distributed or centralized computing network, mainframe computer, or other suitable computing arrangement.

Data Storage

Referring to FIG. 1 in greater detail, the data storage 106 includes source data 102, parameters 104, and assumptions 106. These, as well as other data storage components in the system 100, may be implemented by magnetic hard disk drive, tape storage, or a variety of other storage technologies as discussed in greater detail below.

The source data 102 includes statistics relevant to the simulation and planning of a strategy to implement distribute capture in a banking institution. The source data 102 may include existing data, or information that is manually input by people, or a combination of these. This data may come in the form of spreadsheets, relational databases, files, linked lists, tables, data stored and managed by computer programs in proprietary formats, and other data structures.

This source data 102 is likely to change over time, these changes occurring for example in GL/financial data, productivity data, volume data, etc. A significant value associated with system 100 is the ease of re-running the data analysis described below, which automatically collects and considers updated source data.

Broadly, the parameters 104 are data values that can be changed to alter the strategy for implementing distributed capture, thereby producing different results in the simulation and analysis. In contrast, the assumptions 106 are data values that affect the results of the simulation and analysis, but are beyond peoples' ability to control. The parameters 104 and assumptions 106 may be retained in data storage 106 (as shown), or input directly to the gathering module 108 via the front-end dashboard 101. Some examples of parameters and assumptions are discussed in detail below.

Front-End Dashboard

Basically, the dashboard 101 is a tool for inputting data to the data storage 106 and/or gathering module 108. The dashboard 101 may be implemented in various ways, with one example including a Microsoft Excel workbook. Although reference is made to Microsoft Excel, this and all other spreadsheet based components in this disclosure may instead be implemented using any of the hundreds of varieties of freeware, open source, or proprietary spreadsheets available today. There are many varieties of such spreadsheet programs, such as online programs, products that are part of existing software suites, standalone products, or programs that utilize different paradigms with spreadsheet-like qualities. Furthermore, the dashboard 101 may be implemented with technology distinct from spreadsheets, with some examples including Microsoft Access, SQL Server, Gnumberic, OpenOffice Calc, Actuate e.Spreadsheet, Advantage for Analysts, Quantrix Modeler, Tableau, Infommersion Xcelsius, Lotus 1-2-3, Quattro Pro, PlanMaker, Appleworks, GoBe Productive, Ability Spreadsheet, Mariner Calc, KSpread, 602 Tab, Thinkfree Office, As-Easy-As, and GS-Calc.

The operational details of the dashboard 101 are described in greater detail below, under the heading "Operation."

Gathering Module

Generally, the module 108 collects information from the data source 106 and dashboard 101, and supplies the collected data to the calculators and database 110. In one example, the gathering module 108 coordinates an initial pull of data into the calculators 110. In a different example, the gathering module 108 coordinates the initial pull of data, and additionally manages subsequent data collection for the calculators 110 on demand or according to some schedule. The module 108 may be implemented in various ways, with one example including a software program written in a language such as Visual Basic for Applications. The module 108 may also be implemented in other ways, such as Visual Basic, SQL Server, REALBasic, PowerBASIC, R-Sharp, Freebell, Liberty Basic, Velneo, Java, C#, .Net, C+, and C++.

The operational details of the gathering module 101 are described in greater detail below, under the heading "Operation."

Calculators and Database

Broadly, the calculators and database 110 work as follows. The calculator components 110 perform prescribed computations upon data supplied by the gathering module 108. The database component 110 stores a machine-readable record of the input data, results of the calculator's computations (which provide input for future iterations of the analysis), and so on. More specifically, the calculator component 110 is made up of multiple different calculator subcomponents 110a-110d, each subcomponent performing a different prescribed computation. As one example, the calculators 110a-110d may be implemented by different Microsoft Excel workbooks or worksheets. Of course, implementations beyond workbooks are possible, such as Microsoft Access, SQL Server, Gnumberic, OpenOffice Calc, Actuate e.Spreadsheet, Advantage for Analysts, Quantrix Modeler, Tableau, Infommersion Xcelsius, Lotus 1-2-3, Quattro Pro, PlanMaker, Appleworks, GoBe Productive, Ability Spreadsheet, Mariner Calc, KSpread, 602 Tab, Thinkfree Office, As-Easy-As, GS-Calc, Visual Basic, SQL Server, REALBasic, PowerBASIC, R-Sharp, Freebell, Liberty Basic, Velneo, Java, C#, .Net, C+, and C++. Furthermore, although four calculators 110a-110d are shown, there can be any number, more or less than this.

The database aspect of the module 110 may be implemented by magnetic hard disk drive, tape storage, or a variety of other storage technologies as discussed in greater detail below. In one embodiment, the structure of the database 110 employs Microsoft Excel workbooks, and in this sense, may serve the dual purposes of the database and the calculators.

Alternatively, the data storage may employ another structure such as a linked list, relational database, tables, file, array, or any other suitable structure.

The operational details of the calculators and database 110 are described in greater detail below, under the heading "Operation."

Optimizer

In general, the optimizer 112 is a data processing component that receives output from the calculators 110 and feeds the output back to the calculators 110 as input for the next round of computations. In this way, the calculators are used to perform an iterative analysis, period by period, ultimately lasting for some extended period of time. Additionally, the optimizer 112 performs various types of analysis based on the calculator 110 output. The optimizer 112, in the illustrated example, stores the results of its computations in the database 110, and more particularly, in the spreadsheets used to implement the calculators 110. In one example, the optimizer 112 is implemented by software code written in a language such as Visual Basic. Other technologies may be used to implement the optimizer 112, with some examples including Visual Basic, SQL Server, REALBasic, PowerBASIC, R-Sharp, Freebell, Liberty Basic, Velneo, Java, C#, .Net, C+, and C++.

The functionality of the optimizer is discussed in greater detail below under the heading "Operation."

Output Dashboard

The output dashboard 114 provides a human-readable output of the computations performed by the calculators 110 and the optimizer 112. In one embodiment, the dashboard 114 is implemented by a Microsoft Excel workbook that is filled-in by the optimizer 112 according to calculations by the optimizer 112 and calculators. Continuing with this example, the output dashboard 114 may include a prescribed view of data from the database 110.

Operational details of the output dashboard are described in greater detail below, under the heading "Operation."

Exemplary Digital Data Processing Apparatus

As mentioned above, the system 100 and/or its data processing entities may be implemented in various forms.

Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 2:
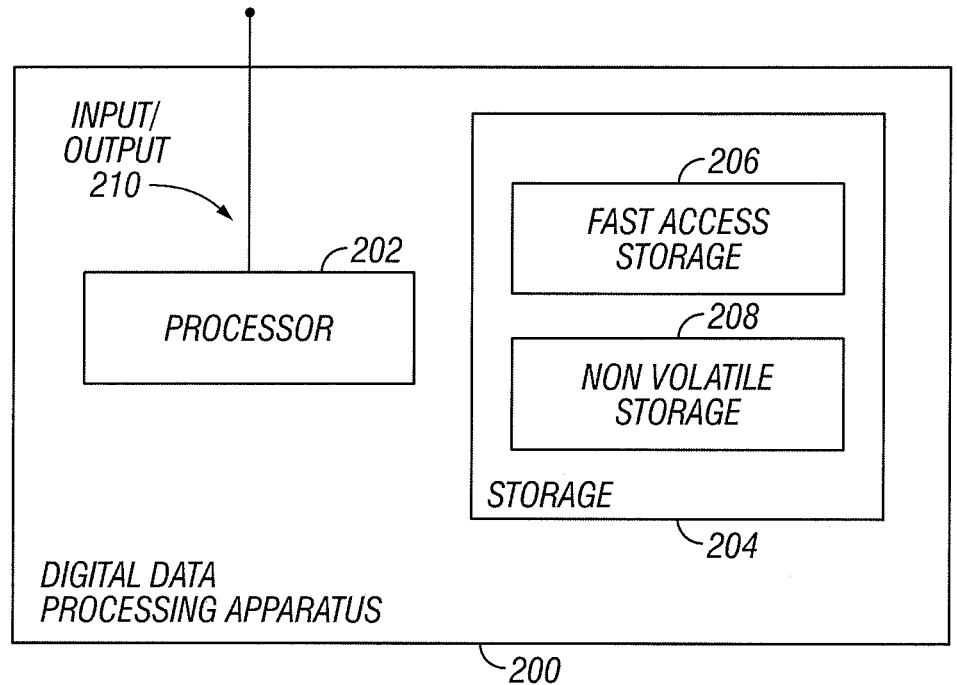
FIG. 2 is a block diagram of a digital data processing machine.
Figure 3:
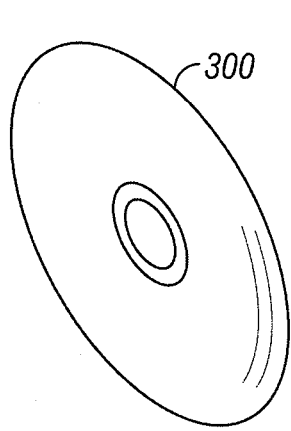
FIG. 3 shows an exemplary storage medium.

As a more specific example, FIG. 2 shows a digital data processing apparatus 200. The apparatus 200 includes a processor 202, such as a microprocessor, personal computer, workstation, controller, microcontroller, state machine, or other processing machine, coupled to a digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, various instances of digital data storage may be used, for example, to provide storage used by the system 100 (FIG. 1), to embody the storage 204 and 208 (FIG. 2), etc. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

In contrast to storage media that contain machine-executable instructions (as described above), a different embodiment uses logic circuitry to implement some or all of the digital data processing features mentioned above.

Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Figure 4:
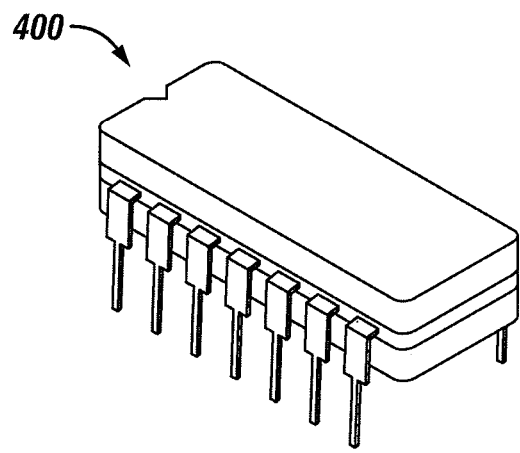
FIG. 4 is a perspective view of exemplary logic circuitry.

FIG. 4 shows an example of logic circuitry in the form of an integrated circuit 400.

Operation

Having described the structural features of the present disclosure, the operational aspect of the disclosure will now be described. The steps of any method, process, or algorithm described in connection with the embodiments disclosed herein may be embodied directly in hardware, software, firmware, or a combination of these.

Data Architecture

The preceding description addressed the hardware components and interconnections of the system 100. The material beneath this heading more specifically addresses the nature of the constituent data and related calculations.

Source Data

The source data 102 may include any or all of the following: various data that exists independently of the system 100, data derived from independent data, and data that is assembled specifically for use with the system 100.

Some examples of source data 102 include Clarity templates (volume and financial data), TEMS (transportation data), DataMart (depository level volume data), and various manual internal workbooks. A further, but non-exhaustive list, includes data such as transit item Volume, on-us item volume, reject repair volume, balancing volume, item capture volume, adjustment volume, ATM deposit envelope volume, FTE for processing the same, productivity data calculated from the volume and FTE, image exchange ramp-up schedule, float categorization by depository location, financial data that includes employment costs, hardware and software costs, business development expense, telecommunication expense, operation losses, clearing costs, IRD costs, FedForward schedule, transportation costs per depository location, ground route, air route, and armored vendor route.

Parameters

Broadly, the parameters 104 are data values that can be changed to alter a contemplated strategy for implementing distributed capture, thereby producing different results in the simulation and analysis. Some examples of parameters include flags, specifications, commands, instructions, limitations, guidelines, rules, or other vehicles prescribing the following:

- Advance specification of a conversion order for depository locations. Depository locations may include, for example, banking branch, lock box, cash vault, ATM, etc.
- An instruction specifying that designated depository locations never undergo conversion to distributed capture.
- An instruction specifying delayed implementation for one or more of the following: depository location, depository locations of a designated region, depository locations of a designated state.
- An instruction specifying that conversion for a depository location, ground transportation route, or air transportation route cannot be performed unless the net financial impact is a cost savings ("positive business case").
- An instruction to always perform distributed capture for transactions of five items or less, but limit full conversion to depository locations, ground transportation routes, or air transportation route where the net financial impact is a cost savings.
- Maximum expenditure for overall conversion to distributed capture technology.
- Maximum number of depository locations to be converted in the overall conversion and/or any timeframe within the simulation.
- Maximum number of monthly conversions by distributed capture channel.
- Change in image exchange ramp-up calendar. This refers to a change to the baseline ramp-up calendar gathered in source data 102, and includes items such as an increase or decrease in the ramp-up speed represented by a percentage change that impacts conversion volume.
- Deposited check volume growth and decline rates by year. This refers to a positive or negative percentage that is applied to baseline volume gathered in source data 102 at the appropriate interim time period, and includes items such as unencoded and pre-encoded items delivered to depository locations and centralized item processing shops.
- Item processing exception rates. This refers to percentages that apply to volumes gathered in source data 102, and includes items such as amount key rate, codeline completion rate, balancing rate, adjustments rate, image inspection rate, and paper exception rate.
- IRD costs. This refers to changes to the baseline IRD costs and document creation allocations identified in source data 102, and includes items such as the displacement of printing IRDs at the Fed to internal sources, the distribution of internally printed IRDs between centralized item processing shops and remote locations, and increases or decreases to the baseline costs for creating IRDs.
- IRD tier ratios. This refers to the allocation of IRDs printed at the Fed between the three tiers, and includes items such as the distribution between tiers 1-3 and changes to the distribution of IRDs within Fed intra-day deadlines impacting costs.
- Severance costs. This refers to the cost per team member per centralized item processing or ATM envelope processing location for severing their employment, and includes items such as retraining costs, 30 day paid non-working notice, and payment of remaining PTO.
- Distributed capture hardware and software costs. This refers to the hardware and software costs associated with capture devices placed in depository locations to facilitate distributed check image capture, and includes items such as desktop scanners, high speed scanners, and vendor software costs.
- Average dollar value of checks. This refers to the average dollar value of transit items used in float calculations.
- Transportation weighting factor. This refers to a positive or negative value that can be applied to the base transportation cost assumptions to increase or decrease transportation costs for any of the five years in the model run.
- Federal funds rate. This refers to the published Federal Funds rates as well as internally projected future Federal Funds rates and includes a value that can be input for each of the five years of a model run.

Assumptions

Broadly, the assumptions 106 are data values that affect the results of the simulation and analysis, but are beyond peoples' ability to control. Some examples of assumptions include:

- Transportation cost. This refers to the cost of transportation used today for moving checks from the depository location to the centralized item processing shops and ATM processing department, and includes items such as the incremental costs associated with each store (if applicable), fixed ground route costs, air route costs, and armored courier costs.
- Productivity rates. This refers to the speed at which widgets are processed, and includes items such as work receipt, item capture, item keying, item balancing, item dispatch, adjustment resolution, and pulling exceptions
- Check volumes. This refers to actual and forecasted item volumes, and includes items such as prime pass check volume, reject repair check volume, balancing check volume, check keying volume, transit check volume, on-us check volume, ATM envelope volume, ATM check volume, and adjustments volume.
- Work mix. This refers to the split of check volume into categories, and includes items such as Inclearings, Pre-encoded, Un-encoded, on-us mix, transit mix.

Operations Divisions financial data. This refers to the operational costs of processing checks, and includes items such as labor expense, occupancy, hardware and software maintenance, asset depreciation, operation losses, and all other operating costs. In one example, this includes financial data likely to be influenced by distributed capture implementation as to each of prescribed divisions of the banking institution.

Calculators

As mentioned above, the calculators 110 perform prescribed computations upon data supplied by the gathering module 108. The following are some exemplary calculator functions.

Volume. Computes volumes of check and ATM activity for the current interim period (e.g., quarter).

Alternative Transportation. Expense for inter-company mail items and items that cannot be cleared via image (e.g. savings bonds, treasury tax and loan coupons, bad image exceptions) required to satisfy delivery needs that, prior to distributed capture, were satisfied by transportation used to relay paper checks.

Item Processing. Expense associated with traditional paper-based Item Processing that is reduced when distributed capture is implemented. More specifically, this means the cost savings associated with no longer receiving, sorting, repairing, balancing, and dispatching checks from centralized item processing shops.

Float. Money saved by reducing float time of checks.

IRD. Cost of generating IRDs.

ATM Transportation. Money saved by using image scanning ATMs which reduce the requirement to transport checks to paper-based item processing centers.

Express ATM Processing Department Savings. Money saved by down-sizing or closing the operations areas that presently serve to open and balance check deposit envelopes that are received at the ATM machines.

Capture Implementation. Direct costs of implementing distributed capture, such as labor, computer hardware and software, etc.

Aggregation. Aggregating computations provided some or all of the other calculators.

Output Dashboard

FIGS. 6-9 illustrate some screen shots from an exemplary output dashboard, to give one specific example of the data content, analysis, and presentation offered by the output dashboard.

Figure 9:
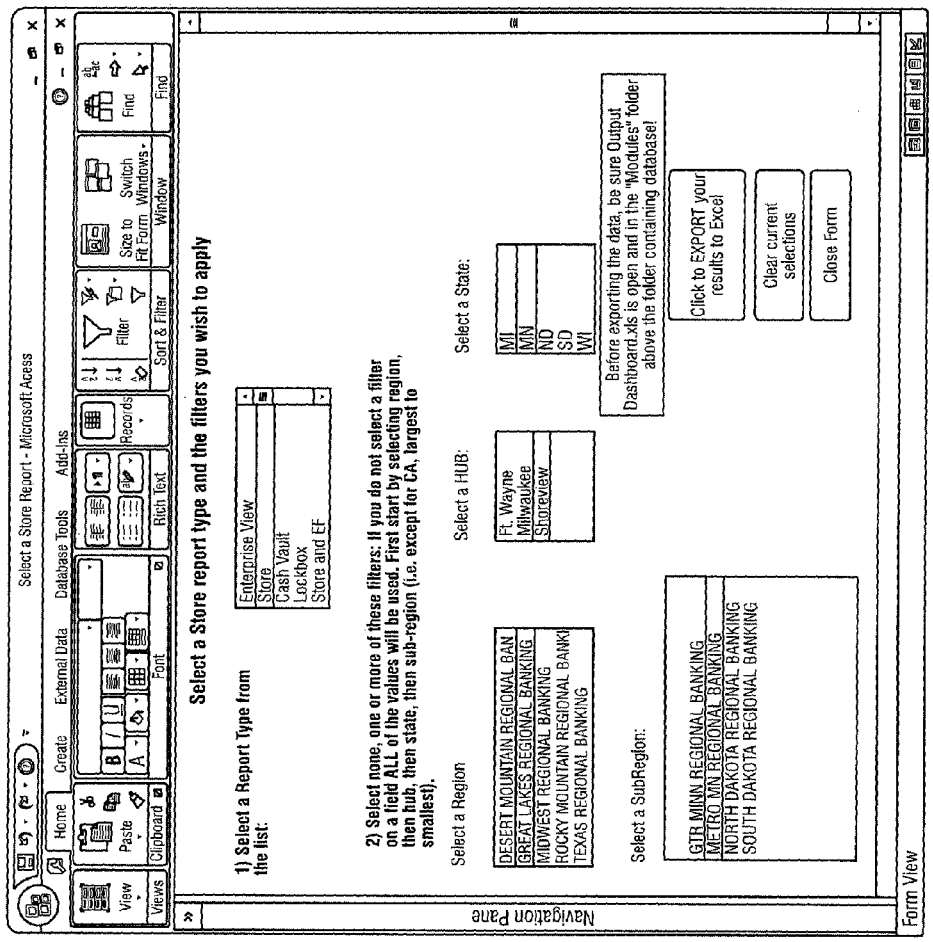

In one example, the output dashboard presents enterprise results from the model run, examines the impacts to Hub unit costs to be used in creating closure scenarios, suggests a list of potential sub-hub cities, and navigates to a filtering mechanism. In this regard, FIG. 6 shows a control panel for the output dashboard, FIG. 7 shows a cost-benefit presentation by channel, and FIG. 8 shows a cost-benefit presentation by category. FIG. 9 shows a screen shot of an exemplary filtering mechanism. The filtering mechanism, an optional component of the output dashboard, drills down into specific channels, hubs, states, regions, and sub-regions.

Operating Sequence

Figure 5:
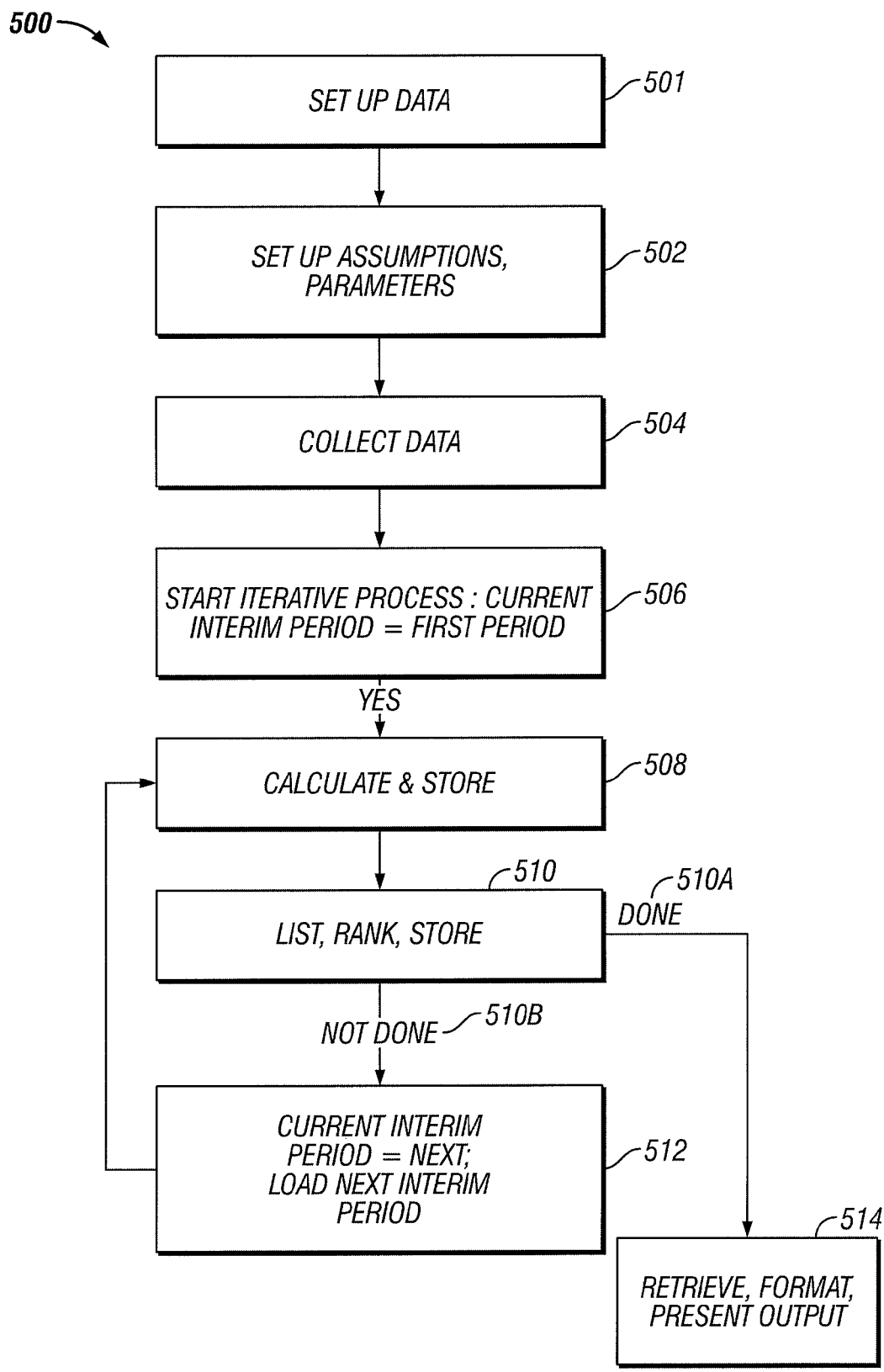
FIG. 5 is a flowchart illustrating an exemplary method of computer driven simulation, analysis, and optimization of the financial consequences of a plan to implement distributed capture at a banking institution.

FIG. 5 shows a sequence 500 for operating the system 100. Step 501 sets up the data to be used in the simulation. For example, step 501 may involve running queries in a language such as SQL, and submitting requests in native source data format for data from existing databases, financial records, reports, or other sources. Step 501 may also include other operations to collect, compile, assemble, format, extract, or otherwise set up source data.

Step 502 sets up the parameters 104 and assumptions 106. In one example, step 502 is performed by people manually filling out one or more pre-configured spreadsheet type workbooks. Of course, the parameters 104 and assumptions 106 may be established in other ways, such as entering data in other formats, submitting data via web interface, submitting data according to prompts of an interactive program, etc. After step 502, the data storage 106 is loaded with the source data, parameters, and assumptions and ready to supply this data as needed in the simulation process.

In step 504, the gathering module 108 collects data from the data storage 106 and loads the collected data into the calculators 110, which as mentioned above, are programmed to calculate cost savings and cost expenditures as to predefined aspects of adopting a distributed capture technology at a banking institution.

Step 506 begins an iterative process. Each iteration concerns a different interim period, ending (or starting) at an interim date. For example, the iterative process may be run according to monthly interim periods, with an overall period of the simulation such as sixty months. As an example, the schedule for the overall simulation, including the various interim dates and end date, may arise as one of the parameters 104, specified directly from the front-end dashboard 101, or come from another source.

In step 508, the calculators 110 compute results for the current interim period based upon presently loaded data and scenario constraints dictated by the parameters and assumptions. Also in this process 506, the calculators 110 store the current results in the database 110.

According to the results of the iterative simulation process (508), the optimizer 112 then prepares (510) a list of recommended depository locations for future implementation of distributed capture technology. Optionally, the optimizer 112 may rank the depository locations according to the financial advantage to be realized by performing its conversion, or another suitable metric. Additionally, the optimizer 112 may indicate an optimal order for converting the listed and/or ranked depository locations. Step 510 stores the list and other related details in the database 110. Accordingly, one result of the process 500 is a listing that targets depository locations for conversion, and optionally provides information as to the specifics for how the rollout should be conducted.

One example of a ranking performed in step 510 is ranking of net financial impact (cost or savings) per depository location, under the proposed distributed capture implementation plan. In another example, step 510 ranks the net financial impact according to each ground transportation route fed by multiple depository locations. In another example, step 510 ranks the net financial impact according to each air transportation route fed by multiple ground transportation routes and multiple depository locations. In still another example, step 510 ranks each of the foregoing, and chooses the option with the most savings.

If the prescribed end date has not been reached (510b), the optimizer 112 proceeds to step 512. Here, the optimizer loads the calculator's current output back into the calculators to be used as input for the next round of computations. If, for example, depository locations were targeted for conversion at particular interim date, then this information is fed into the next round of computations so that they can reflect that these depository locations have already been converted.

When the prescribed end date is reached (510a), then the iterative part (steps 506, 508, 510, 512) of the routine 500 is finished. In a specific example, this may occur after the optimizer 112 runs for a prescribed overall period of sixty months, or reaches a prescribed "end early" target (based on a parameter such as maximum number of conversions or dollar threshold). At this point, the routine 500 proceeds (510a) to step 514 and begins to wrap up. In step 514, the optimizer 112 retrieves and formats data from the calculators and the optimizer's own analysis, and prepares this data for use by the output dashboard 114. In one example, the optimizer 112 downloads this data to the output dashboard 114. Alternatively, the optimizer 112 may prepare the data for the output dashboard 114 to retrieve on demand. The dashboard 114 provides a human readable output that includes a user selectable portion of the stored depository location listing, rankings, and other information from steps 508 and 510.

OTHER EMBODIMENTS

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

All structural and functional equivalents to the elements of the above-described embodiments that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 USC 112, sixth paragraph, unless the element is expressly recited using the phrase "means for" or, in the case of a method claim, the phrase "step for."

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks; modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A computer-implemented method to simulate and analyze financial aspects of implementation of a plan to convert existing depository locations of a banking institution to distributed capture technology, the method comprising operations of:
   establishing simulation parameters defining selected aspects of the plan;
   establishing simulation assumptions prescribing expected values of certain data that is outside control of the banking institution and likely to have an influence on said financial aspects;
   collecting predefined existing data from predetermined sources;
   loading data into calculators programmed to calculate predicted cost savings and cost expenditures resulting from implementation of the plan, the loaded data comprising: the collected existing data, the simulation parameters, and the simulation assumptions;
   performing, using a computing device, an iterative simulation process, comprising:
      the calculators computing current results for an interim date or period based upon presently loaded data;
      storing the current results and loading the current results into the calculators for use as presently loaded data for a next interim date;
      repeating the calculating operation and the storing operation until the interim date or period reaches a prescribed end date or period;
   according to results of the iterative simulation process, performing optimization operations including:
      preparing a list of recommended depository locations for future implementation of distributed capture technology; and
      ranking the recommended depository locations according to predetermined criteria:
         ranking savings by depository location;
         ranking savings by ground route fed by multiple depository locations; and
         ranking savings by air route fed by multiple ground routes; and
   an output dashboard providing a human readable output including a user selectable portion of the stored results and selected depository locations.

2. The method of claim 1, where each of the depository locations comprises one of the following:
   branch, automated teller machine, cash vault, lockbox.

3. The method of claim 1, where the calculators comprise spreadsheets.

4. The method of claim 1, the calculators comprising each of:
   a first calculator computing volumes of check and automated teller machine (ATM) activity for an interim date or period;
   a second calculator computing expenses for alternative transportation due to transportation removed because of existing depository locations of the banking institution converted to distributed capture technology;
   a third calculator computing savings achieved by centrally processing checks;

a fourth calculator computing savings achieved by reducing float time of checks;
a fifth calculator computing costs of preparing image replacement documents;
a sixth calculator computing costs of ATM transportation;
a seventh calculator computing savings achieved by applying distributed capture to ATMs;
an eighth calculator computing costs of implementing capture technology including at least labor and computing equipment costs;
a ninth calculator aggregating computations from some or all of the other calculators.

5. The method of claim 1, the calculators comprising at least one of:
a first calculator computing volumes of check and automated teller machine (ATM) activity for an interim date or period;
a second calculator computing expenses for alternative transportation due to transportation removed because of existing depository locations of the banking institution converted to distributed capture technology;
a third calculator computing savings achieved by centrally processing checks;
a fourth calculator computing savings achieved by reducing float time of checks;
a fifth calculator computing costs of preparing image replacement documents;
a sixth calculator computing costs of ATM transportation;
a seventh calculator computing savings achieved by applying distributed capture to ATMs;
an eighth calculator computing costs of implementing capture technology including at least labor and computing equipment costs;
a ninth calculator aggregating computations from some or all of the other calculators.

6. The method of claim 1, the parameters including each of:
a parameter prescribing a predetermined conversion order for depository locations;
a parameter prescribing that specified depository location never undergo conversion;
a parameter specifying that conversion is delayed for one or more of the following: one or more specified depository locations, all depository locations of one or more specified regions, all depository locations of one or more specified selected states;
a parameter limiting conversion to positive business cases;
a parameter specifying to perform conversion of all depository locations as to transactions of five items of less, but to perform full conversion for a, depository location only if there exists a positive business case;
a parameter specifying a maximum expenditure for overall conversion;
a parameter specifying a maximum number of total conversions;
a parameter specifying one of the following: a maximum number of monthly conversions, a maximum number of monthly conversions by distributed capture channel.

7. The method of claim 1, the parameters including each of the following:
a parameter specifying a change in image exchange ramp-up calendar;
a parameter specifying a deposited check volume growth and decline rates by year;
a parameter specifying item processing exception rates;
a parameter specifying an image exchange ramp-up forecast;
a parameter specifying image replacement document costs;
a parameter specifying image replacement document tier ratios;
a parameter specifying severance costs;
a parameter specifying distributed capture hardware and software costs;
a parameter specifying average dollar value of checks;
a parameter specifying transportation cost increases or decreases;
a parameter specifying a federal funds rate.

8. The method of claim 1, the assumptions comprising assumptions as to each of:
transportation cost;
productivity rates;
check volumes;
work mix;
operations division financial data.

9. A computer-implemented method to simulate and analyze financial aspects of implementation of a plan to convert existing depository locations of a banking institution to distributed capture technology, the method comprising steps of:
a step for establishing simulation parameters defining selected aspects of the plan;
a step for establishing simulation assumptions prescribing expected values of certain data that is outside control of the banking institution and likely to have an influence on said financial aspects;
a step for collecting predefined existing data from predetermined sources;
a step for loading data into calculators programmed to calculate predicted cost savings and cost expenditures resulting from implementation of the plan, the loaded data comprising: the collected existing data, the simulation parameters, and the simulation assumptions;
a step for performing, using a computing device, an iterative simulation process, comprising:
the calculators computing current results for an interim date or period based upon presently loaded data;
storing the current results and loading the current results into the calculators for use as presently loaded data for a next interim date;
repeating the calculating operation and the storing operation until the interim date or period reaches a prescribed end date or period;
a step for, according to results of the iterative simulation process, performing optimization operations including:
preparing a list of recommended depository locations for future implementation of distributed capture technology; and
ranking the recommended depository locations according to predetermined criteria:
ranking savings by depository location;
ranking savings by ground route fed by multiple depository locations; and
ranking savings by air route fed by multiple ground routes; and
a step for an output dashboard providing a human readable output including a user selectable portion of the stored results and selected depository locations.

10. A computer-implemented apparatus to simulate and analyze financial aspects of implementation of a plan to convert existing depository locations of a banking institution to distributed capture technology, the apparatus comprising:
a processor executing code stored on digital data storage;
digital data storage containing simulation parameters defining selected aspects of the plan;

digital data storage containing simulation assumptions prescribing expected values of certain data that is outside control of the banking institution and likely to have an influence on said financial aspects;

digital data storage containing predefined existing data from predetermined sources;

a gathering device programmed to perform operations including loading data into calculators programmed to calculate predicted cost savings and cost expenditures resulting from implementation of the plan, the loaded data comprising: the collected existing data, the simulation parameters, and the simulation assumptions;

calculators and an optimizer programmed to cooperatively perform an iterative simulation process, comprising:
the calculators computing current results for an interim date or period based upon presently loaded data;
storing the current results and loading the current results into the calculators for use as presently loaded data for a next interim date;
repeating the calculating operation and the storing operation until the interim date or period reaches a prescribed end date or period;

the optimizer further programmed to perform optimization operations according to results of the iterative simulation process, said optimization operations including:
preparing a list of recommended depository locations for future implementation of distributed capture technology; and
ranking the recommended depository locations according to a net financial impact, including:
first ranking savings by depository location;
second ranking savings by ground route fed by multiple depository locations;
third ranking savings by air route fed by multiple ground routes; and
selecting one of the first, second, and third rankings that results in highest cost savings; and an output dashboard providing a human readable output including a user selectable portion of the stored results and selected depository locations.

* * * * *